(12) United States Patent
Hill et al.

(10) Patent No.: US 12,487,584 B2
(45) Date of Patent: Dec. 2, 2025

(54) VELOCITY CONTROL FOR CONSTRUCTION MACHINES

(71) Applicant: Caterpillar Trimble Control Technologies LLC, Dayton, OH (US)

(72) Inventors: Jason Hill, Superior, CO (US); Albert Wray, Sidney, OH (US)

(73) Assignee: Caterpillar Trimble Control Technologies LLC, Dayton, OH (US)

(*) Notice: Subject to any disclaimer, the term of this patent is extended or adjusted under 35 U.S.C. 154(b) by 309 days.

(21) Appl. No.: 18/141,735

(22) Filed: May 1, 2023

(65) Prior Publication Data

US 2023/0341836 A1   Oct. 26, 2023

Related U.S. Application Data

(63) Continuation of application No. 17/103,281, filed on Nov. 24, 2020, now Pat. No. 11,669,073.

(51) Int. Cl.
*G05B 19/4155* (2006.01)
*G05B 19/416* (2006.01)

(52) U.S. Cl.
CPC ....... *G05B 19/4155* (2013.01); *G05B 19/416* (2013.01); *G05B 2219/31229* (2013.01); *G05B 2219/37347* (2013.01)

(58) Field of Classification Search
None
See application file for complete search history.

(56) References Cited

U.S. PATENT DOCUMENTS

| | | | |
|---|---|---|---|
| 11,669,073 B2 | 6/2023 | Hill et al. | |
| 2005/0194163 A1* | 9/2005 | Wray | E02F 3/847 172/811 |
| 2006/0041361 A1* | 2/2006 | Matrosov | E02F 9/2045 701/50 |

(Continued)

FOREIGN PATENT DOCUMENTS

| | | | |
|---|---|---|---|
| CN | 111447826 A | | 7/2020 |
| EP | 0510215 B1 | * | 5/1997 |

(Continued)

OTHER PUBLICATIONS

International Search Report and Written Opinion for Application No. PCT/US2021/060153, mailed Feb. 25, 2022, 16 pages.

(Continued)

*Primary Examiner* — David Earl Ogg
(74) *Attorney, Agent, or Firm* — Kilpatrick Townsend & Stockton LLP

(57) ABSTRACT

Described herein are systems, methods, and other techniques for controlling a velocity of a construction machine operating within a construction site. Sensor data is captured using one or more sensors of the construction machine while the construction machine is moving at the velocity in a forward or a backward direction. An actual surface of the construction site is estimated based on the sensor data. A deviation between a target surface and the actual surface is calculated. An actual performance metric is calculated based on the deviation. The actual performance metric is compared to a target performance metric to determine a velocity adjustment. The velocity of the construction machine is adjusted by the velocity adjustment.

20 Claims, 7 Drawing Sheets

(56) References Cited

U.S. PATENT DOCUMENTS

| | | | |
|---|---|---|---|
| 2009/0069987 A1* | 3/2009 | Omelchenko | E02F 9/2045 |
| | | | 701/50 |
| 2013/0081831 A1* | 4/2013 | Hayashi | E02F 3/847 |
| | | | 172/4.5 |
| 2014/0032061 A1 | 1/2014 | Wulf et al. | |
| 2016/0170090 A1* | 6/2016 | Collins | G01C 15/00 |
| | | | 702/5 |
| 2018/0209119 A1* | 7/2018 | Horstman | F02D 41/0002 |
| 2020/0131740 A1 | 4/2020 | Hashimoto | |
| 2020/0256021 A1 | 8/2020 | McAlpine et al. | |
| 2022/0120059 A1* | 4/2022 | Matsuyama | E02F 3/437 |
| 2022/0163946 A1 | 5/2022 | Hill et al. | |

FOREIGN PATENT DOCUMENTS

| | | |
|---|---|---|
| EP | 2 131 027 A1 | 12/2009 |
| WO | 2016194426 A1 | 12/2016 |
| WO | 2019/115016 A1 | 6/2019 |

OTHER PUBLICATIONS

International Preliminary Report on Patentability for Application No. PCT/US2021/060153, mailed Jun. 8, 2023, 10 pages.
U.S. Appl. No. 17/103,281 First Action Interview Pilot Program Pre-Interview Communication mailed Jun. 27, 2022, 4 pages.
U.S. Appl. No. 17/103,281 First Action Interview Office Action Summary mailed Sep. 21, 2022, 4 pages.
U.S. Appl. No. 17/103,281 Notice of Allowance mailed Feb. 1, 2023, 8 pages.

\* cited by examiner

VELOCITY CONTROL FOR CONSTRUCTION MACHINES

CROSS-REFERENCES TO RELATED APPLICATIONS

The present application is a continuation of U.S. application Ser. No. 17/103,281, filed Nov. 24, 2020 the entire contents of which are incorporated by reference herein for all purposes.

BACKGROUND OF THE INVENTION

Modern construction machines have dramatically increased the efficiency of performing various construction projects. For example, earthmoving machines employing automatic slope control systems are able to grade project areas using fewer passes than what was previously done manually. As another example, modern asphalt pavers and other road makers have allowed replacement of old roads and construction of new roads to occur on the order of hours and days instead of what once took place over weeks and months. Due to the automation of various aspects, construction projects can be carried out by construction crews with fewer individuals than what was previously required. Much of the technological advances of construction machines are owed in part to the availability of accurate sensors that allow real-time monitoring of the condition and position of a machine's components and/or the environment surrounding the machine. Despite the improvements in modern construction machines, new systems, methods, and techniques are still needed.

BRIEF SUMMARY OF THE INVENTION

The present disclosure relates broadly to techniques for controlling the velocity of heavy equipment. In particular, many embodiments described herein relate to velocity-adjustment techniques for earthmoving construction machines.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method of controlling a velocity of a construction machine operating within a construction site, the method comprising: capturing sensor data using one or more sensors of the construction machine while the construction machine is moving at the velocity in a forward or a backward direction; estimating an actual surface of the construction site based on the sensor data captured using the one or more sensors; calculating a deviation between a target surface and the actual surface; calculating an actual performance metric based on the deviation; comparing the actual performance metric to a target performance metric to determine a velocity adjustment, wherein the velocity adjustment is determined so as to reduce an error between the actual performance metric and the target performance metric; and adjusting the velocity of the construction machine by the velocity adjustment.

Example 2 is the computer-implemented method of example(s) 1, wherein the deviation includes a plurality of distances between the target surface and the actual surface.

Example 3 is the computer-implemented method of example(s) 1, wherein adjusting the velocity of the construction machine by the velocity adjustment includes: providing the velocity adjustment to a velocity controller of the construction machine.

Example 4 is the computer-implemented method of example(s) 1, wherein the one or more sensors include an inertial sensor mounted to an implement of the construction machine.

Example 5 is the computer-implemented method of example(s) 4, wherein the inertial sensor is configured to detect a vertical movement of the implement while the construction machine is moving.

Example 6 is the computer-implemented method of example(s) 1, wherein comparing the actual performance metric to the target performance metric to determine the velocity adjustment includes: calculating the error between the actual performance metric and the target performance metric; and determining the velocity adjustment based on the error.

Example 7 is the computer-implemented method of example(s) 1, wherein the actual performance metric is an increasing function of the deviation.

Example 8 is the computer-implemented method of example(s) 7, wherein: the velocity adjustment is positive if the actual performance metric is less than the target performance metric; and the velocity adjustment is negative if the actual performance metric is greater than the target performance metric.

Example 9 is the computer-implemented method of example(s) 1, wherein the actual performance metric is a decreasing function of the deviation.

Example 10 is the computer-implemented method of example(s) 9, wherein: the velocity adjustment is negative if the actual performance metric is less than the target performance metric; and the velocity adjustment is positive if the actual performance metric is greater than the target performance metric.

Example 11 is a non-transitory computer-readable medium comprising instructions that, when executed by one or more processors, cause the one or more processors to perform operations for controlling a velocity of a construction machine operating within a construction site, the operations comprising: capturing sensor data using one or more sensors of the construction machine while the construction machine is moving at the velocity in a forward or a backward direction; estimating an actual surface of the construction site based on the sensor data captured using the one or more sensors; calculating a deviation between a target surface and the actual surface; calculating an actual performance metric based on the deviation; comparing the actual performance metric to a target performance metric to determine a velocity adjustment, wherein the velocity adjustment is determined so as to reduce an error between the actual performance metric and the target performance metric; and adjusting the velocity of the construction machine by the velocity adjustment.

Example 12 is the non-transitory computer-readable medium of example(s) 11, wherein the deviation includes a plurality of distances between the target surface and the actual surface.

Example 13 is the non-transitory computer-readable medium of example(s) 11, wherein adjusting the velocity of the construction machine by the velocity adjustment includes: providing the velocity adjustment to a velocity controller of the construction machine.

Example 14 is the non-transitory computer-readable medium of example(s) 11, wherein the one or more sensors include an inertial sensor mounted to an implement of the construction machine.

Example 15 is the non-transitory computer-readable medium of example(s) 14, wherein the inertial sensor is configured to detect a vertical movement of the implement while the construction machine is moving.

Example 16 is a system comprising: one or more processors; and a computer-readable medium comprising instructions that, when executed by one or more processors, cause the one or more processors to perform operations comprising: capturing sensor data using one or more sensors of a construction machine while the construction machine is moving at a velocity in a forward or a backward direction; estimating an actual surface of a construction site based on the sensor data captured using the one or more sensors; calculating a deviation between a target surface and the actual surface; calculating an actual performance metric based on the deviation; comparing the actual performance metric to a target performance metric to determine a velocity adjustment, wherein the velocity adjustment is determined so as to reduce an error between the actual performance metric and the target performance metric; and adjusting the velocity of the construction machine by the velocity adjustment.

Example 17 is the system of example(s) 16, wherein the deviation includes a plurality of distances between the target surface and the actual surface.

Example 18 is the system of example(s) 16, wherein adjusting the velocity of the construction machine by the velocity adjustment includes: providing the velocity adjustment to a velocity controller of the construction machine.

Example 19 is the system of example(s) 16, wherein the one or more sensors include an inertial sensor mounted to an implement of the construction machine.

Example 20 is the system of example(s) 19, wherein the inertial sensor is configured to detect a vertical movement of the implement while the construction machine is moving.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
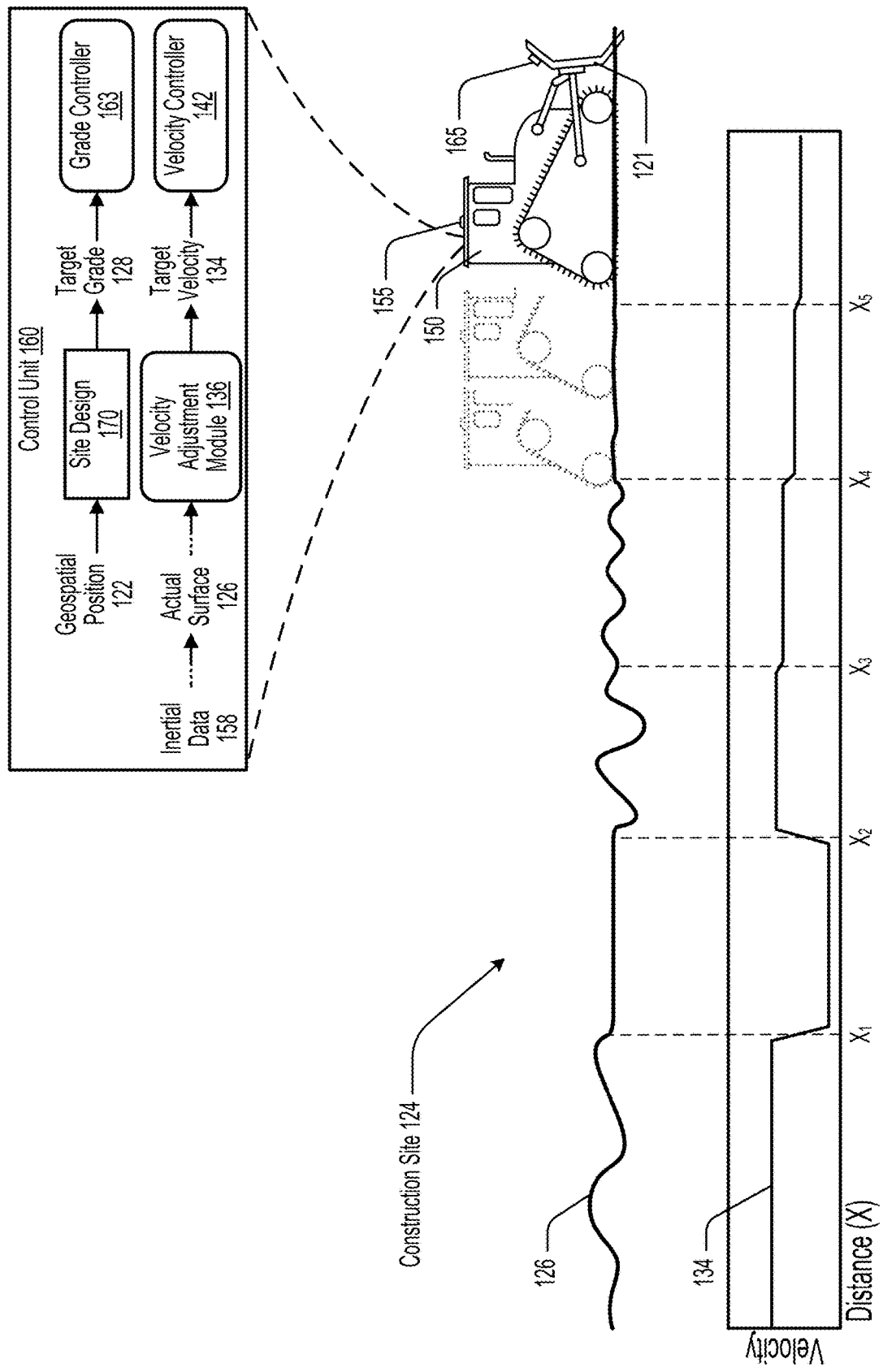
FIG. 1 illustrates an example implementation of one or more techniques of the present disclosure within a construction environment.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Embodiments described herein relate to systems, methods, and other techniques for controlling the velocity of heavy equipment such as earthmoving construction machines. By controlling the machine velocity in the manner described, better control of the machine's implement can be achieved, resulting in a better finish grade surface with reduced unevenness, which is an undesirable effect that typically occurs when the machine is moving at certain speeds. Embodiments described herein can improve the graded surface by optimizing the velocity of the machine for a range of surface types (e.g., sand, clay, gravel, etc.) and for a range of surface designs.

In some instances, techniques described herein provide for a velocity control loop to run on the control unit that takes the vehicle travel speed into account. This velocity control loop can directly affect the stability of the primary control loop that is handling the vertical control for the implement (e.g., blade, moldboard, bucket, etc.), which may be referred to as the vertical grade control loop. As such, the velocity of the machine can be increased or decreased in conjunction with the vertical grade control loop to achieve optimal results. In some instances, if the output from the primary vertical grade control loop starts to exhibit decreasing stability, e.g., increasing levels of output or drive to the valves, the velocity control loop can either increase or decrease the vehicle velocity to increase the stability of the vertical grade control loop.

The control unit can measure and record statistics as they relate to the finish grade surface, which may be referred to as the actual surface. This can form the core of the data the velocity control loop takes as input to process on and make velocity adjustments. The velocity control loop can utilize a form of hysteresis to avoid overdriving or over correcting the velocity of the platform. The velocity control loop can further be made aware of what machine make/model it is installed on and, based on test data, have a predetermined velocity range for which it is more likely that optimal stability will be achieved.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example implementation of one or more techniques of the present disclosure within a construction environment. Specifically, FIG. 1 shows a construction machine 150 being deployed at a construction site 124 and having the control thereof at least partially implemented by a control unit 160 which, in various embodiments, may be communicatively coupled to a position sensor 155 and/or an inertial sensor 165 that are mounted to construction machine 150. While construction site 124 is generally described herein as corresponding to an earthmoving site such as a road or building construction site, the present disclosure is applicable to a wide variety of construction, maintenance, or agricultural projects in which heavy equipment is used. Similarly, while construction machine 150 is generally described herein as corresponding to an earthmoving construction machine, the various techniques described herein are applicable to a wide variety of construction machines or heavy equipment such as graders, excavators, bulldozers, backhoes, pavers (e.g., concrete, asphalt, slipform, vibratory, etc.), compactors, scrapers, loaders, material handlers, combine harvesters, spreaders, and the like.

In some embodiments, construction machine 150 may include a tractor with wheels, axles, and a gasoline-, diesel-, electric-, or steam-powered engine for providing power and traction to construction machine 150 to drive along a desired path, often at a constant speed. In some instances, construction machine 150 may be a tracked vehicle that incorporates a continuous track of treads or track plates that are driven by the vehicle's wheels. An operator of construction machine 150 may provide inputs to control unit 160 using various input devices such as levers, switches, buttons, pedals, steering wheels, and touch screens, which can cause various actuators to move construction machine 150.

In some instances, construction machine 150 may include an implement 121, which may be the primary component of construction machine 150 that is controlled to interact with elements of construction site 124. For example, at an earthmoving site, implement 121 may be the component of construction machine 150 that interacts with (e.g., pushes, scoops, cuts, digs, compresses, etc.) the material to be graded, such as the blade of a bulldozer, the bucket of an excavator, the drum of a compactor, or some other ground-engaging tool. As another example, at an agricultural site, implement 121 may be the header of a combine harvester or the boom of a spreader. As another example, at a road construction site, implement 121 may be the screed of an asphalt paver.

It should be appreciated that, in some embodiments, implement 121 and construction machine 150 may be considered to be separate bodies that have a semi-rigid coupling between them. The coupling is semi-rigid in that the bodies can move relative to each other but they can also be fixed at a given orientation. Some examples of semi-rigid couplings used on construction or earthmoving equipment include c-frames, angle c-frames, push arms, L-shaped push arms, and the like.

In some embodiments, control unit 160 may determine a geospatial position 122 of construction machine 150 based on sensor data captured by one or more sensors (e.g., position sensor 155) mounted to construction machine 150. For example, position sensor 155 may be a global navigation satellite systems (GNSS) receiver that receives wireless signals from one or more GNSS satellites. By processing the received wireless signals, a position of the GNSS receiver may be calculated. In some instances, during operation of construction machine 150, geospatial position 122 is determined and is used to query a site design 170, which may provide translations between two-dimensional (2D) or three-dimensional (3D) positions within construction site 124 and target grades (e.g., target slope and/or target elevations). The obtained target grade can be fed into a grade controller 163, which may employ various control mechanisms (such as, for example, a proportional-integral-derivative (PID) controller) for driving an actual grade (e.g., actual slope and/or actual elevation) toward the target grade. The actual grade of construction machine 150 may be adjusted by sending a control signal to one or more actuators that are mechanically coupled to the implement.

In some embodiments, control unit 160 may use inertial data 158 captured by inertial sensor 165 mounted to implement 121 (along with other types of sensor data) to determine an actual surface 126 of the earth or ground at construction site 124. For example, inertial data 158 may be analyzed to track the vertical, horizontal, and/or angular movement of implement 121 as construction machine 150 is moving in a forward or reverse direction. The movement of implement 121, along with the known velocity of construction machine 150, may be used to create a 3D representation for actual surface 126 or a different representation with fewer or more data points.

Actual surface 126 and be compared to a target surface to calculate a deviation $D(t)$ between the two. The deviation $D(t)$ resulting from the comparison may be used by a velocity adjustment module 136 to determine a new target velocity 134 for construction machine 150. In general, if the deviation $D(t)$ is sufficiently large, the target velocity 134 is determined to be less than the current velocity, and if the deviation $D(t)$ is sufficiently small, the target velocity 134 is determined to be greater than the current velocity. Finally, target velocity 134 is fed into a velocity controller, which may employ various control mechanisms (such as, for example, a PID controller) for driving an actual velocity toward target velocity 134.

In the illustrated example, construction machine 150 attempts to grade the earth at construction site 124 with a flat target surface. Upon construction machine 150 reaching point $X_1$, actual surface 126 is estimated and is determined to deviate significantly from the flat target surface. As a result, at point $X_1$, velocity adjustment module 136 determines that target velocity 134 should be decreased. Upon construction machine 150 reaching point $X_2$, actual surface 126 is again estimated and is determined to deviate too little from the flat target surface with respect to a target performance metric. Velocity adjustment module 136 therefore determines that target velocity 134 should be increased from its previous value. Upon construction machine 150 reaching point $X_3$, actual surface 126 is again estimated and is determined to deviate too much from the flat target surface with respect to the target performance metric. Velocity adjustment module 136 therefore determines that target velocity 134 should be decreased from its previous value. Target velocity 134 is again decreased at each of points $X_4$ and $X_5$ in a similar manner, after which construction machine 150 arrives at a final velocity, which produces a deviation between actual surface 126 and the target surface that is determined to be within an acceptable amount.

The target performance metric may be chosen to balance efficiency and accuracy so that the construction project may be completed in a timely manner while maintaining a level of quality. In some instances, the above steps may be repeated in response to the target performance metric changing, the target surface changing, and/or after a predetermined amount of time. For example, velocity adjustment module 136 may be executed at a predetermined rate while construction machine 150 is moving, such as every 0.1 seconds, 1 second, 10 seconds, or the like.

Figure 2:
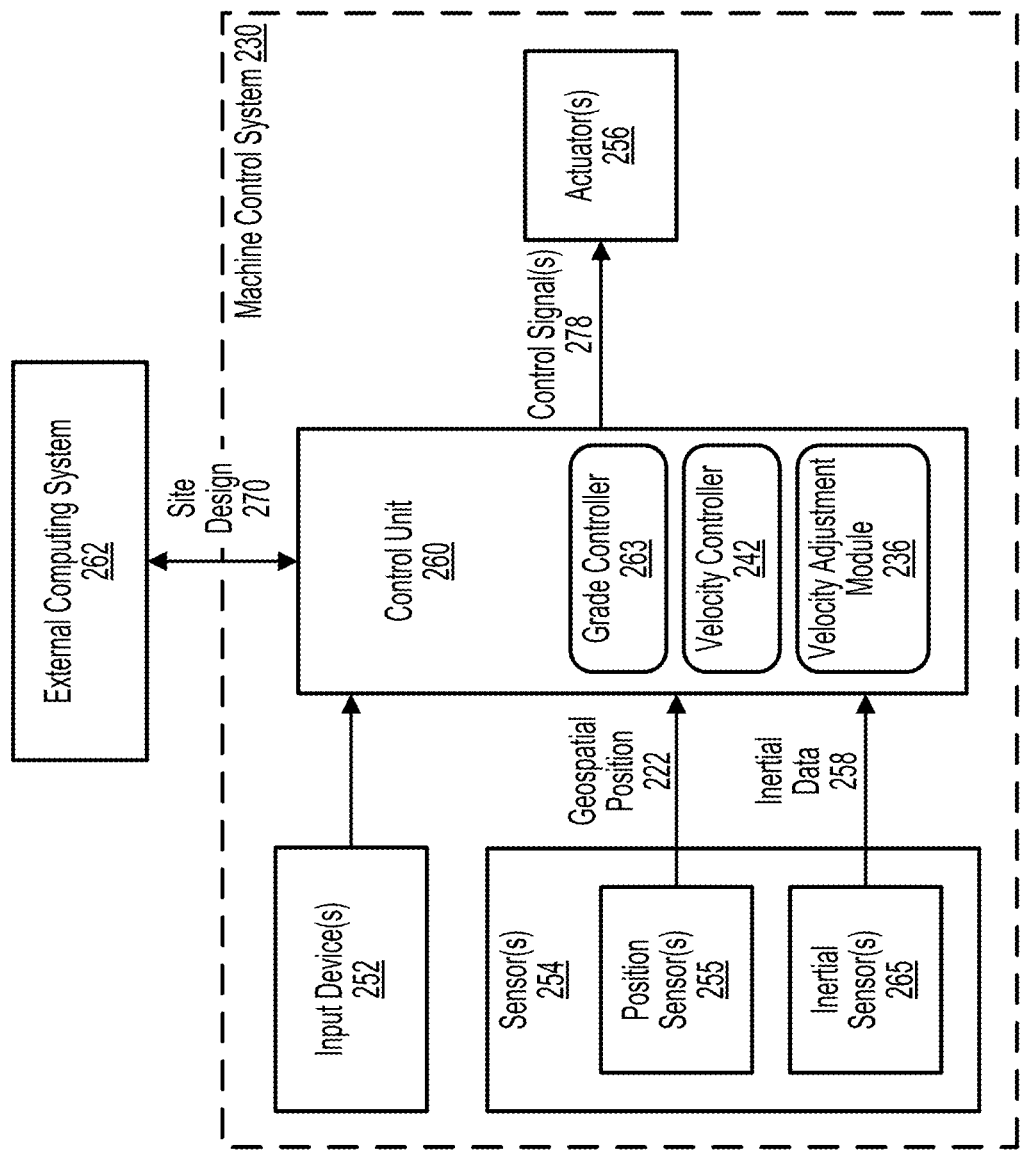
FIG. 2 illustrates an example machine control system.

FIG. 2 illustrates an example machine control system 230, in accordance with some embodiments of the present disclosure. Machine control system 230 may include various input devices 252, sensors 254, actuators 256, and computing devices for allowing one or more operators of the construction machine to complete a construction operation. The components of machine control system 230 may be mounted to or integrated with the components of the construction machine such that the construction machine may include machine control system 230. The components of machine control system 230 may be communicatively coupled to each other via one or more wired and/or wireless connections.

Machine control system 230 may include a control unit 260 that receives data from the various sensors and inputs and generates commands that are sent to the various actuators and output devices. In the illustrated example, control unit 260 receives input data from input device(s) 252 and sensor data from sensor(s) 254, and generates control signal(s) 278 which are sent to actuator(s) 256. Control unit 260 may include one or more processors and an associated memory. In some embodiments, control unit 260 may be communicatively coupled to an external computing system 262 located external to machine control system 230 and the construction machine. External computing system 262 may send instructions to control unit 260 of the details of a construction operation. For example, external computing system 262 may send a site design 270 to control unit 260. External computing system 262 may also send alerts and other general information to control unit 260, such as traffic conditions, weather conditions, the locations and status of material transfer vehicles, and the like.

In some embodiments, machine control system 230 includes one or more input device(s) 252 for receiving various input data (e.g., a target surface, a target grade, a site plan) from a user. Input device(s) 252 may include a keyboard, a touchscreen, a touchpad, a switch, a lever, a button, a steering wheel, an acceleration pedal, a brake pedal, and the like. Input device(s) 252 may be mounted to any physical part of the construction machine. Input device(s) 252 may further receive user inputs indicating a desired movement of the construction machine, a desired movement of the implement, and the like.

In some embodiments, sensor(s) 254 may include one or more position sensor(s) 255, inertial sensor(s) 265, image capture devices, proximity sensors, ground-sensing radar devices, and/or Hall-effect sensors, among other possibilities. Position sensor(s) 255 may be a combination of GNSS receivers, which determine position using wireless signals received from satellites, and total stations, which determine position by combining distance, vertical angle, and horizontal angle measurements. Inertial sensor(s) 265 may be one or more sensors that detect movement of components of the construction machine to which they are rigidly attached or mounted. For example, inertial sensor(s) 265 may include one or more gyroscopes for detecting angular acceleration, angular rate and/or angular position, one or more accelerometers for detecting linear acceleration, linear velocity, and/or linear position, one or more inertial measurement units (IMUs) which may each include one or more accelerometers, one or more gyroscopes, and/or one or more magnetometers for detecting the above-listed types of data, among other possibilities.

In some embodiments, inertial sensor(s) 265 may directly detect angular rate and may integrate to obtain angular position, or alternatively an inertial sensor may directly measure angular position and may determine a change in angular position (e.g., compute the derivative) to obtain angular rate. In many instances, inertial sensor(s) 265 can be used to determine the yaw angle (rotation angle with respect to a vertical axis), the pitch angle (rotation angle with respect to a transverse axis), and/or the roll angle (rotation angle with respect to a longitudinal axis) of a component of construction machine.

Control unit 260 may include various controllers and modules to assist in the generation of control signal(s) 278. Each of the controllers and modules may include dedicated hardware and/or may be performed using the main processor and/or memory of control unit 260. In some embodiments, control unit 260 includes a grade controller 263 that drives an actual/measured/estimated grade toward a target grade. In some instances, grade controller 263 calculates a measured grade using the sensor data, performs a comparison between the measured grade and the target grade, and generates control signal(s) 278 so as to cause actuator(s) 256 to move in a way that drives the measured grade toward the target grade. Similarly, control unit 260 may include a velocity controller 242 that drives an actual/measured/estimated velocity toward a target velocity. In some instances, velocity controller 242 receives the measured velocity or calculates a measured velocity using the sensor data, performs a comparison between the measured velocity and the target velocity, and generates control signal(s) 278 so as to cause actuator(s) 256 to move in a way that drives the measured velocity toward the target velocity.

Control signal(s) 278 may include direct current (DC) or alternating current (AC) voltage signals, DC or AC current signals, and/or information-containing signals. An example of an information-containing signal may be controller area network (CAN) message that may be sent along a CAN bus or other communication medium. In some instances, one or more of control signal(s) 278 may include a pneumatic or hydraulic pressure. Upon receiving control signal(s) 278, actuator(s) 256 may be caused to move in a specified manner, such as by extending, retracting, rotating, lifting, or lowering by a specified amount. Actuator(s) 256 may use various forms of power to provide movement to the components of the construction machine. For example, actuator(s) 256 may be electric, hydraulic, pneumatic, mechanical, or thermal, among other possibilities.

Figure 3:
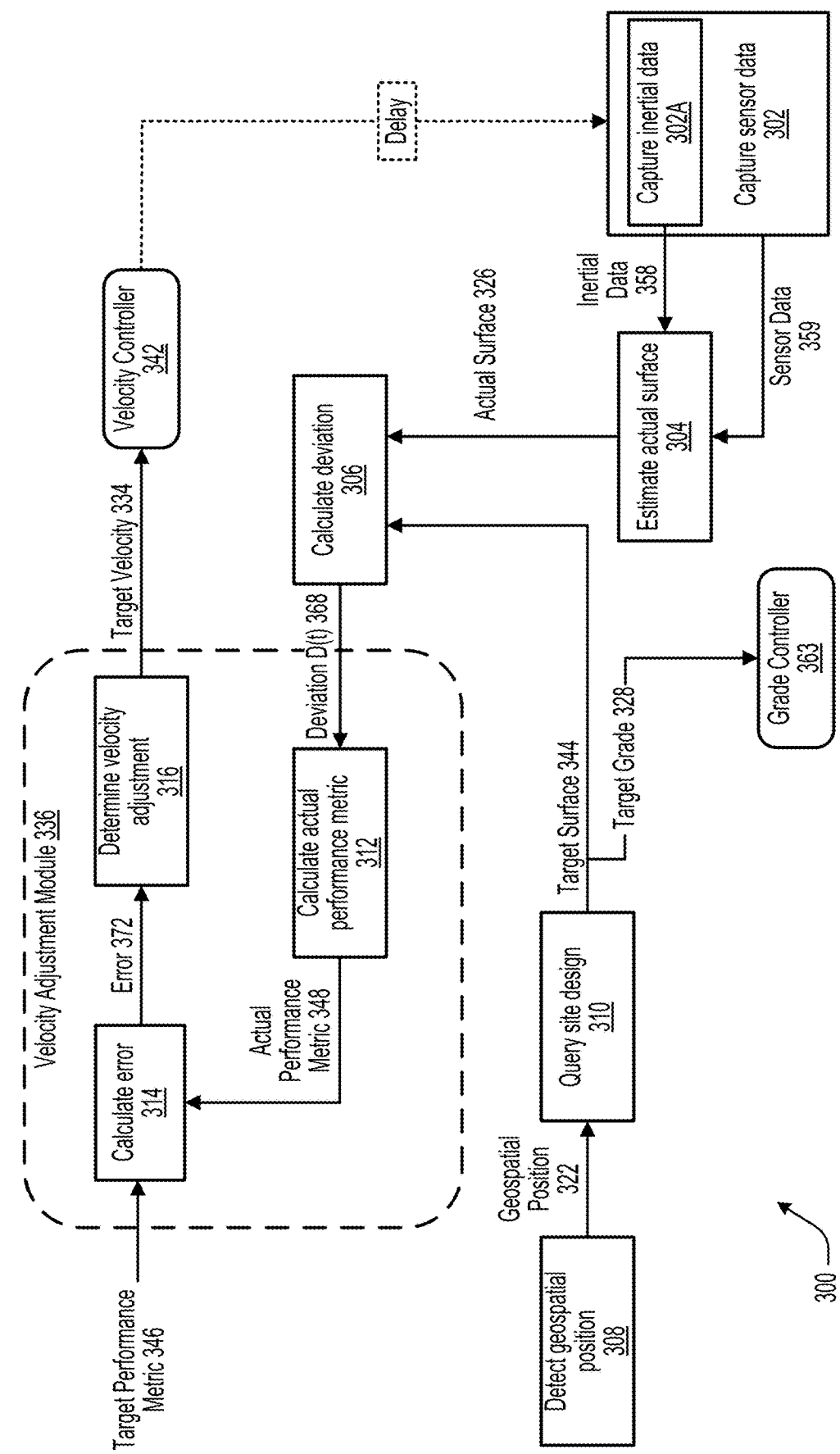
FIG. 3 illustrates an example control process that may be implemented by a machine control system.

FIG. 3 illustrates an example control process 300 that may be implemented by a machine control system, such as machine control system 230, according to some embodiments of the present disclosure. FIG. 3 shows various actions performed by the machine control system and the movement of data between the controllers and modules that generate the control signals that are sent to the actuators. In some instances, each iteration of control process 300 begins at block 302, at which sensor data 359 is captured using one or more sensors mounted to the construction machine, such as to the implement. The sensors may include position sensors, inertial sensors, ultrasonic sensors, laser sensors, among other types of sensors equipped on the construction machine. Block 302 may include block 302A, at which inertial data 358 is captured using one or more inertial sensors mounted to the construction machine, such as to the implement. At block 304, an actual surface 326 of the construction site is estimated based on sensor data 359 and/or inertial data 358. At block 306, a deviation 368 (e.g., deviation D(t)) between a target surface 344 and actual surface 326 is calculated.

In some instances, target surface 344 is included in a site design. In some instances target surface 344 may include a target grade 328, which may be provided to a grade controller 363. At block 308, a geospatial position 322 of the construction machine is detected using one or more position sensors. At block 310, the site design may be queried using geospatial position 322 to obtain target surface 344. Deviation 368 may be provided to a velocity adjustment module 336, and at block 312, an actual performance metric 348 is calculated based on deviation 368. A target performance metric 346 may also be provided to velocity adjustment module 336 using an input device or may be specified in the site design, and at block 314, and error 372 between actual performance metric 348 and target performance metric 346 is calculated.

At block 316, a velocity adjustment is determined based on error 372. The velocity adjustment may be incorporated into (e.g., added to) a previous target velocity to produce a target velocity 334, which is provided to a velocity controller 342. In one example, if error 372 is less than a threshold or is trending down, the system is considered to be operating "below range", and thus the velocity adjustment is negative such that target velocity 334 is decreased. In the same example, if error 372 is less than the threshold and is trending up, the system is considered to be operating "with improvement", and thus the velocity adjustment is positive such that target velocity 334 is increased. In the same example, if error 372 is greater than the threshold and is trending up, the system is considered to be operating "above target", and thus the velocity adjustment is positive such that target velocity 334 is increased. In the same example, if none of the above conditions are true, the system is considered to be operating "in range", and thus the velocity adjustment is zero such that target velocity 334 is maintained. In some examples, the rate of change of the velocity is a function (e.g., proportional) of the size of error 372.

In some instances, target velocity 334 can be filtered so as to not change too quickly, which can yield undesirable results. This can be accomplished using low pass filtering, hysteresis, rate limiting, among other possibilities. In some instances, velocity controller 342 can be configured to receive various types of travel velocity commands, such as absolute travel velocity commands (e.g., travel at 1.5 meters/second) or relative travel velocity commands to the nominal velocity (e.g., travel at 0.1 meters/second above the currently set travel velocity). A machine travel velocity command executing computer can be outfitted with the ability to track and compensate for the machine actual travel velocity.

The above-described steps of control process 300 may be repeated after a predetermined amount of time, as illustrated by the delay block in FIG. 3. Alternatively or additionally, the steps may be repeated in response to one or more of: the availability of new sensor data 359 and/or new inertial data 358, a change to target surface 344, and/or a change to target performance metric 346, among other possibilities.

Figure 4:
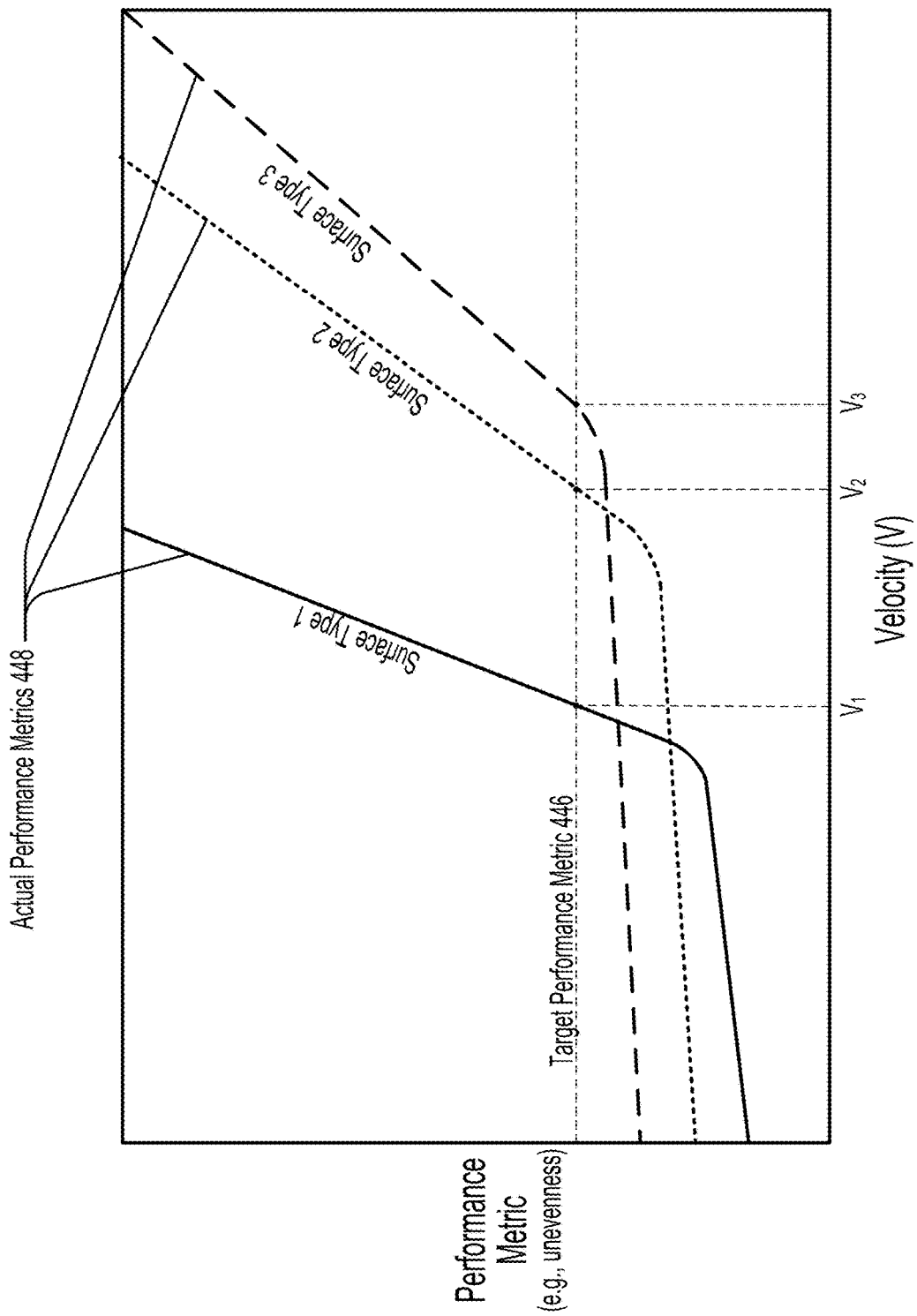
FIG. 4 illustrates an example plot showing performance metric as a function of velocity for three different surface types.

FIG. 4 illustrates an example plot showing performance metric as a function of velocity for three different surface types, according to some embodiments. In the illustrated example, actual performance metrics 448 for three different surface types are plotted as a function of the velocity of the construction machine, with velocity represented on the horizontal axis and performance metric represented on the vertical axis. As described herein, actual performance metrics 448 are calculated based on the deviation D(t), and in the example of FIG. 4, each of actual performance metrics 448 is an increasing function of the deviation, such that higher values of the performance metric correspond to worse accuracy of the actual surface (e.g., the performance metric may be the unevenness of the deviation). When the control process is being executed while the construction machine is traveling on one of Surface Types 1, 2, or 3, the velocity of the construction machine is driven toward the velocity at which the corresponding actual performance metric 448 is equal to a target performance metric 446. This "final"
velocity differs for each of the surface types. For example, the final velocity $V_1$ for Surface Type 1 is less than the final velocity $V_2$ for Surface Type 2, which is less than the final velocity $V_3$ for Surface Type 3.

Figure 5:
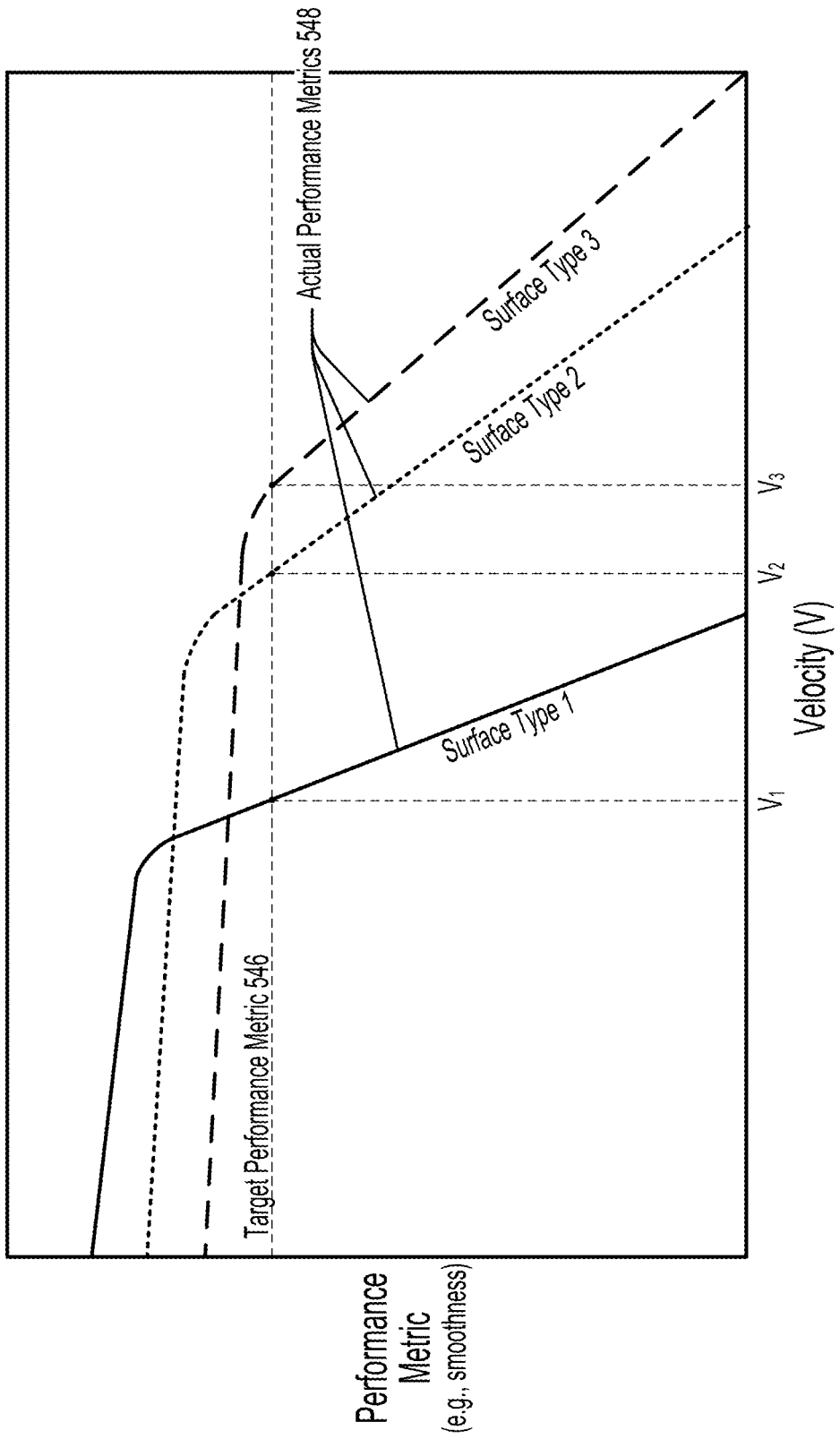
FIG. 5 illustrates an example plot showing performance metric as a function of velocity for three different surface types.

FIG. 5 illustrates an example plot showing performance metric as a function of velocity for three different surface types, according to some embodiments. Similar to FIG. 4, actual performance metrics 548 for three different surface types are plotted as a function of the velocity of the construction machine, with velocity represented on the horizontal axis and performance metric represented on the vertical axis. In contrast to FIG. 4, in the example of FIG. 5, each of actual performance metrics 548 is a decreasing function of the deviation, such that higher values of the performance metric correspond to better accuracy of the actual surface (e.g., the performance metric may be the smoothness of the deviation). When the control process is being executed while the construction machine is traveling on one of Surface Types 1, 2, or 3, the velocity of the construction machine is driven toward the velocity at which the corresponding actual performance metric 548 is equal to a target performance metric 546. FIGS. 4 and 5 demonstrate how different performance metrics may be used to achieve the same final velocities, and that different final velocities can be achieved for different surface types.

Figure 6:
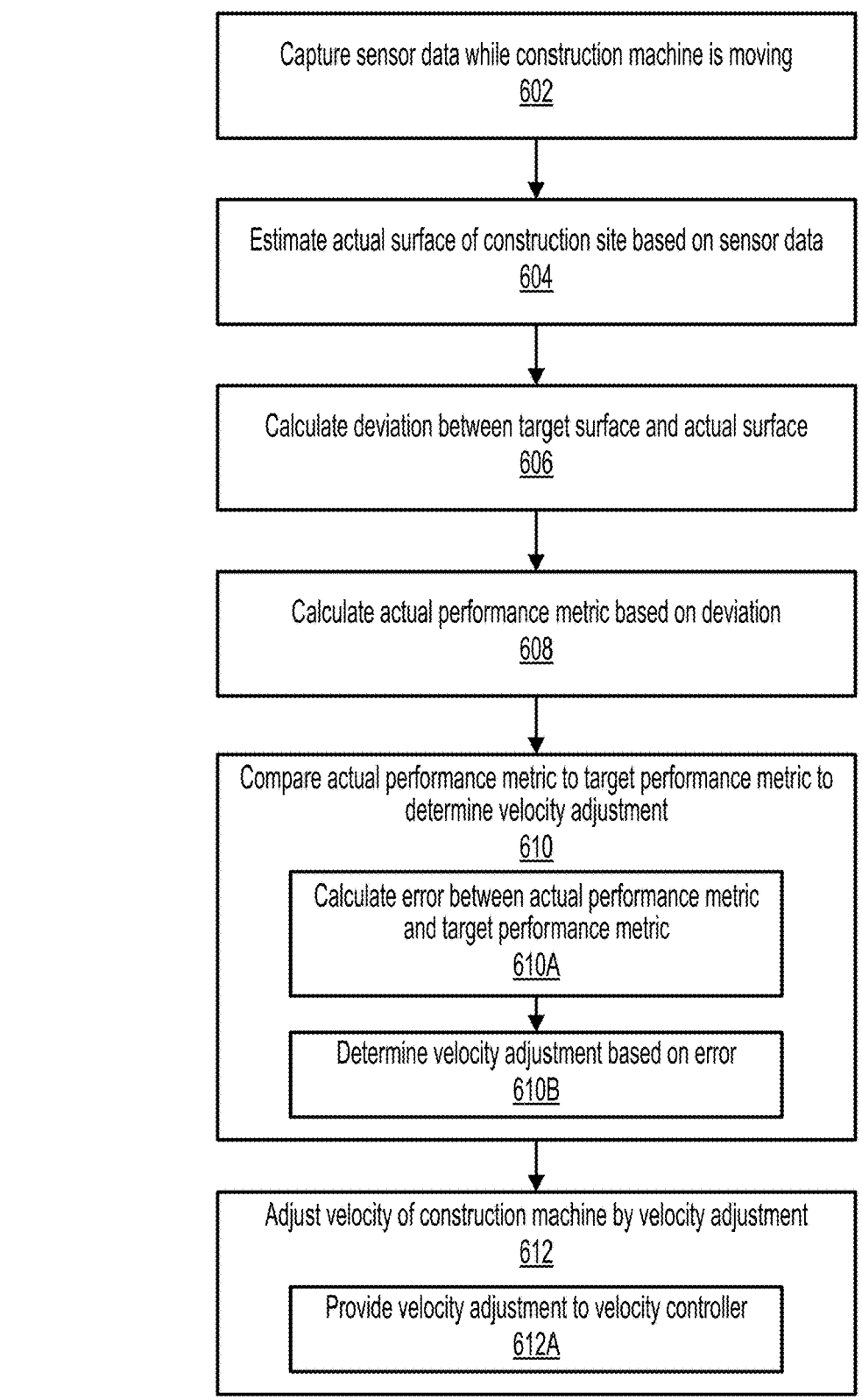
FIG. 6 illustrates a method of controlling a velocity of a construction machine operating within a construction site.

FIG. 6 illustrates a method 600 of controlling a velocity of a construction machine (e.g., construction machine 150) operating within a construction site (e.g., construction site 124). One or more steps of method 600 may be omitted during performance of method 600, and steps of method 600 need not be performed in the order shown. One or more steps of method 600 may be performed by one or more processors, such as those included in a control unit (e.g., control units 160, 260) of the construction machine. Method 600 may be implemented as a computer-readable medium or computer program product comprising instructions which, when the program is executed by one or more computers, cause the one or more computers to carry out the steps of method 600.

At step 602, sensor data (e.g., sensor data 359) is captured using one or more sensors (e.g., sensors 254) of the construction machine while the construction machine is moving at a velocity in a forward or a backward direction. The sensor data may include inertial data (e.g., inertial data 158, 258, 358) captured by an inertial sensor (e.g., inertial sensors 165, 265). The inertial sensor may be attached or mounted to the construction machine, such as to an implement (e.g., implement 121) of the construction machine. In some embodiments, the inertial data is indicative of a vertical, horizontal, and/or angular movement of the implement while the construction machine is moving. The sensor data may further include one or more geospatial positions (e.g., geospatial positions 122, 222, 322) of the construction machine captured by position sensors (e.g., position sensors 155, 255) attached or mounted to the construction machine. In some instances, the one or more geospatial positions may be used to determine the construction machine's actual velocity.

At step 604, an actual surface (e.g., actual surfaces 126, 326) of the construction site is estimated based on the sensor data captured using the one or more sensors. In some embodiments, the actual surface may be a 3D representation of the earth or ground at the construction site where the construction machine has passed over and/or graded. In some embodiments, the actual surface may be a plurality of heights that are determined based on the vertical, horizontal, and/or angular movement of the implement as determined using the inertial data.

At step 606, a deviation (e.g., deviation 368) between a target surface (e.g., target surface 344) and the actual surface is calculated. The target surface may be extracted from a site design (e.g., site designs 170, 270) or may be provided by an input device (e.g., input device 252). In some embodiments, the target surface may be a 3D representation of the earth or ground at the construction site. In some embodiments, method 600 includes the step of receiving the target surface. The deviation may include one or more distances between the target surface and the actual surface. For example, the deviation may include a single distance or a plurality of distances. In some instances, each of the one or more distances may be time referenced (e.g. associated with the time at which the construction machine captured the sensor data) and, in some instances, the deviation may be expressed as a function of time. In some examples, the deviation may include N values corresponding to the most recent N values of the actual surface.

At step 608, an actual performance metric (e.g., actual performance metrics 348, 448, 548) is calculated based on the deviation. In some embodiments, the actual performance metric may include a single value that is calculated based on a statistical analysis of the deviation. For example, the actual performance metric may be equal to an average of the deviation, a weighted average of the deviation (with more recent deviation values weighted more heavily then less recent deviation values), an inverse of the deviation, an average inverse of the deviation, a maximum of the deviation, a minimum of the deviation, a fitted parameter resulting from a parameterization of the deviation, or some other statistical measure of the deviation or the N values of the deviation. As such, the actual performance metric may be an increasing function of the deviation (e.g., as the deviation generally increases, the actual performance metric also increases) or a decreasing function of the deviation (e.g., as the deviation generally increases, the actual performance metric decreases).

At step 610, the actual performance metric is compared to a target performance metric (e.g., target performance metrics 346, 446, 546) to determine a velocity adjustment. The velocity adjustment may be determined so that the error is reduced upon the velocity adjustment being applied. The target performance metric may be extracted from the site design or may be provided by the input device. In some embodiments, step 610 may include one or both of steps 610A and 610B. At step 610A, an error is calculated between the actual performance metric and the target performance metric. In some instances, the error is calculated by subtracting the actual performance metric from the target performance metric. At step 610B, the velocity adjustment is determined based on the error. In embodiments in which the actual performance metric is an increasing function of the deviation, the velocity adjustment is positive if the actual performance metric is less than the target performance metric and negative if the actual performance metric is greater than the target performance metric. In embodiments in which the actual performance metric is a decreasing function of the deviation, the velocity adjustment is negative if the actual performance metric is less than the target performance metric and positive if the actual performance metric is greater than the target performance metric.

At step 612, the velocity of the construction machine is adjusted by the velocity adjustment. In some embodiments, a new target velocity (e.g., target velocities 134, 334) is determined based on the previous target velocity and the velocity adjustment by, for example, adding the velocity adjustment to the previous target velocity. In some embodiments, step 612 may include providing the velocity adjustment to a velocity controller (e.g., velocity controllers 142, 242, 342) of the construction machine, which may employ various control mechanisms for driving an actual velocity of the construction machine toward the target velocity. In some embodiments, one or more control signals (e.g., control signals 278) may be generated and sent to one or more actuators (e.g., actuators 256) of the construction machine to cause the velocity of the construction machine to be adjusted by the velocity adjustment.

Figure 7:
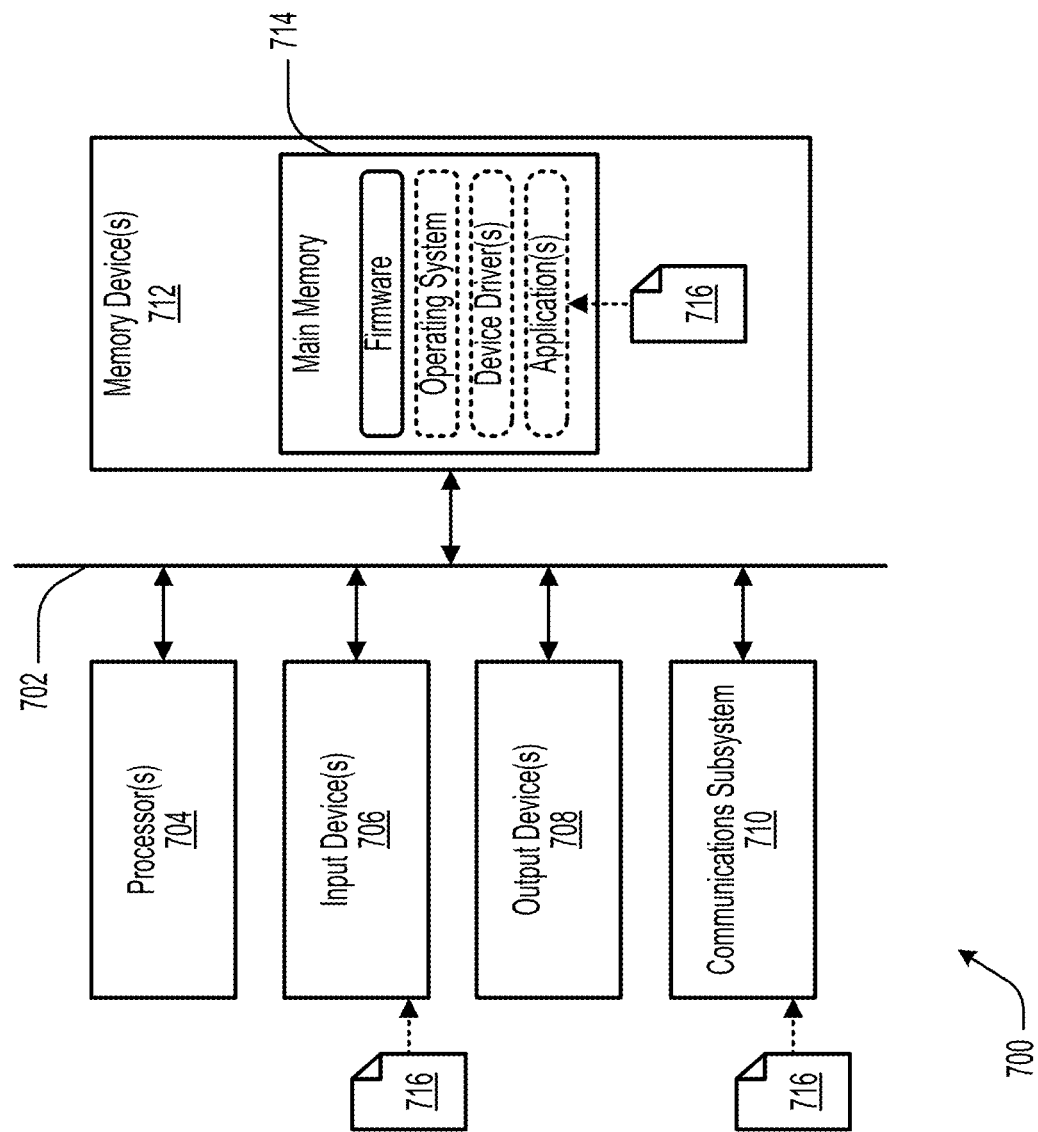
FIG. 7 illustrates an example computer system comprising various hardware elements.

FIG. 7 illustrates an example computer system 700 comprising various hardware elements, according to some embodiments of the present disclosure. Computer system 700 may be incorporated into or integrated with devices described herein and/or may be configured to perform some or all of the steps of the methods provided by various embodiments. For example, in various embodiments, computer system 700 may be incorporated into control units 160, 260 and/or may be configured to perform method 600. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 700 may be coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 702 may include one or more buses connecting pins of the hardware elements of computer system 700. For example, communication medium 702 may include a bus connecting processor(s) 704 with main memory 714, referred to as a system bus, and a bus connecting main memory 714 with input device(s) 706 or output device(s) 708, referred to as an expansion bus. The system bus may consist of several elements, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 704 may include one or more multi-core processors, in which each core may read and execute program instructions simultaneously with the other cores.

Input device(s) 706 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 706 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, and may be provided with control signals by computer system 700.

Communications subsystem 710 may include hardware components for connecting computer system 700 to systems or devices that are located external computer system 700, such as over a computer network. In various embodiments, communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 704 and memory device(s) 712 are illustrated as being separate elements, it should be understood that processor(s) 704 may include varying levels of on-processor memory, such as processor registers and caches that may be utilized by a single processor or shared between multiple processors.

Memory device(s) 712 may include main memory 714, which may be directly accessible by processor(s) 704 via the memory bus of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as random-access memory (RAM), such as dynamic RAM (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 716, executable by computer system 700. In one example, such instructions 716 may be received by computer system 700 using communications subsystem 710 (e.g., via a wireless or wired signal carrying instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 700. For example, the non-transitory computer-readable medium may be one of memory device(s) 712, as shown in FIG. 7, with instructions 716 being stored within memory device(s) 712. In some cases, the non-transitory computer-readable medium may be separate from computer system 700. In one example, the non-transitory computer-readable medium may a removable media provided to input device(s) 706, such as those described in reference to input device(s) 706, as shown in FIG. 7, with instructions 716 being provided to input device(s) 706. In another example, the non-transitory computer-readable medium may a component of a remote electronic device, such as a mobile phone, that may wirelessly transmit a data signal carrying instructions 716 to computer system 700 using communications subsystem 716, as shown in FIG. 7, with instructions 716 being provided to communications subsystem 710.

Instructions 716 may take any suitable form to be read and/or executed by computer system 700. For example, instructions 716 may be source code (written in a human-readable programming language such as Java, C, C++, C#, Python), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of controlling a construction machine operating within a construction site, the method comprising:
    capturing sensor data using one or more sensors of the construction machine while the construction machine is moving at a velocity in a forward or a backward direction;
    estimating a geospatial position of the construction machine based on the sensor data;
    querying a site design using the geospatial position of the construction machine to obtain a target surface and a target grade;
    estimating an actual surface of the construction site based on the sensor data;
    calculating a deviation between the target surface and the actual surface;
    calculating an actual performance metric based on the deviation and an output of a grade control loop that adjusts a grade of the construction machine;
    determining a target velocity based on the actual performance metric; and
    concurrently performing:
        adjusting the velocity of the construction machine based on the target velocity; and adjusting the grade of the construction machine based on the target grade using the grade control loop.

2. The computer-implemented method of claim 1, wherein determining the target velocity based on the actual performance metric includes:
comparing the actual performance metric to a target performance metric to determine a velocity adjustment, wherein the velocity adjustment is determined so as to reduce an error between the actual performance metric and the target performance metric; and
determining the target velocity based on the velocity adjustment.

3. The computer-implemented method of claim 1, wherein the deviation is calculated based on a plurality of distances between the target surface and the actual surface.

4. The computer-implemented method of claim 1, wherein adjusting the velocity of the construction machine includes:
providing the target velocity to a velocity controller of the construction machine.

5. The computer-implemented method of claim 1, wherein the one or more sensors include an inertial sensor mounted to an implement of the construction machine.

6. The computer-implemented method of claim 5, wherein the inertial sensor is configured to detect a vertical movement of the implement while the construction machine is moving.

7. The computer-implemented method of claim 1, wherein the actual performance metric is an increasing function of the deviation.

8. A non-transitory computer-readable medium comprising instructions that, when executed by one or more processors, cause the one or more processors to perform operations for controlling a construction machine operating within a construction site, the operations comprising:
capturing sensor data using one or more sensors of the construction machine while the construction machine is moving at a velocity in a forward or a backward direction;
estimating a geospatial position of the construction machine based on the sensor data;
querying a site design using the geospatial position of the construction machine to obtain a target surface and a target grade;
estimating an actual surface of the construction site based on the sensor data;
calculating a deviation between the target surface and the actual surface;
calculating an actual performance metric based on the deviation and an output of a grade control loop that adjusts a grade of the construction machine;
determining a target velocity based on the actual performance metric; and
concurrently performing:
adjusting the velocity of the construction machine based on the target velocity; and
adjusting the grade of the construction machine based on the target grade using the grade control loop.

9. The non-transitory computer-readable medium of claim 8, wherein determining the target velocity based on the actual performance metric includes:
comparing the actual performance metric to a target performance metric to determine a velocity adjustment, wherein the velocity adjustment is determined so as to reduce an error between the actual performance metric and the target performance metric; and
determining the target velocity based on the velocity adjustment.

10. The non-transitory computer-readable medium of claim 8, wherein the deviation is calculated based on a plurality of distances between the target surface and the actual surface.

11. The non-transitory computer-readable medium of claim 8, wherein adjusting the velocity of the construction machine includes:
providing the target velocity to a velocity controller of the construction machine.

12. The non-transitory computer-readable medium of claim 8, wherein the one or more sensors include an inertial sensor mounted to an implement of the construction machine.

13. The non-transitory computer-readable medium of claim 12, wherein the inertial sensor is configured to detect a vertical movement of the implement while the construction machine is moving.

14. The non-transitory computer-readable medium of claim 8, wherein the actual performance metric is an increasing function of the deviation.

15. A system comprising:
one or more processors; and
a non-transitory computer-readable medium comprising instructions that, when executed by one or more processors, cause the one or more processors to perform operations for controlling a construction machine operating within a construction site, the operations comprising:
capturing sensor data using one or more sensors of the construction machine while the construction machine is moving at a velocity in a forward or a backward direction;
estimating a geospatial position of the construction machine based on the sensor data;
querying a site design using the geospatial position of the construction machine to obtain a target surface and a target grade;
estimating an actual surface of the construction site based on the sensor data;
calculating a deviation between the target surface and the actual surface;
calculating an actual performance metric based on the deviation and an output of a grade control loop that adjusts a grade of the construction machine;
determining a target velocity based on the actual performance metric; and
concurrently performing:
adjusting the velocity of the construction machine based on the target velocity; and
adjusting the grade of the construction machine based on the target grade using the grade control loop.

16. The system of claim 15, wherein determining the target velocity based on the actual performance metric includes:
comparing the actual performance metric to a target performance metric to determine a velocity adjustment, wherein the velocity adjustment is determined so as to reduce an error between the actual performance metric and the target performance metric; and
determining the target velocity based on the velocity adjustment.

17. The system of claim 15, wherein the deviation is calculated based on a plurality of distances between the target surface and the actual surface.

18. The system of claim 15, wherein adjusting the velocity of the construction machine includes:
   providing the target velocity to a velocity controller of the construction machine.

19. The system of claim 15, wherein the one or more sensors include an inertial sensor mounted to an implement of the construction machine.

20. The system of claim 19, wherein the inertial sensor is configured to detect a vertical movement of the implement while the construction machine is moving.

* * * * *